June 30, 1931.  N. A. CHRISTENSEN  1,812,037
BRAKE MECHANISM
Original Filed April 30, 1928   2 Sheets-Sheet 1

INVENTOR.
Niels A. Christensen
BY Charles & French
ATTORNEYS

June 30, 1931. N. A. CHRISTENSEN 1,812,037
BRAKE MECHANISM
Original Filed April 30, 1928 2 Sheets-Sheet 2
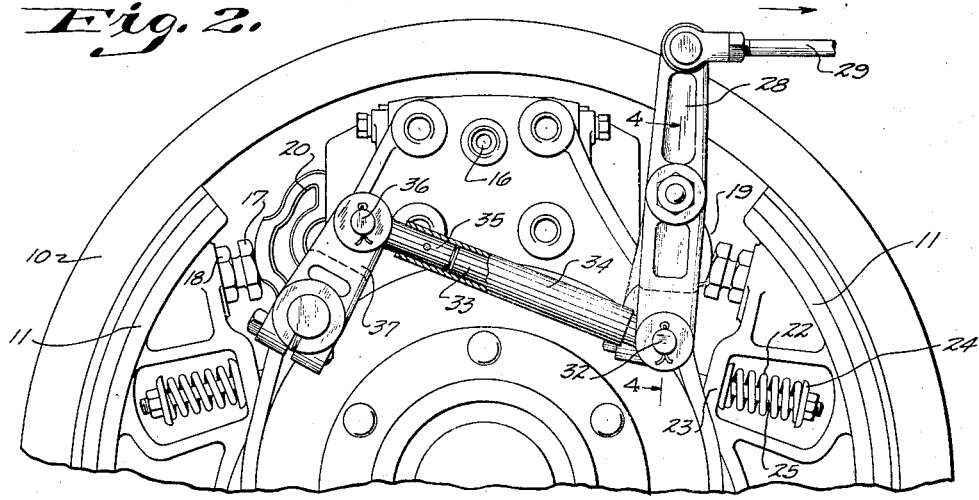
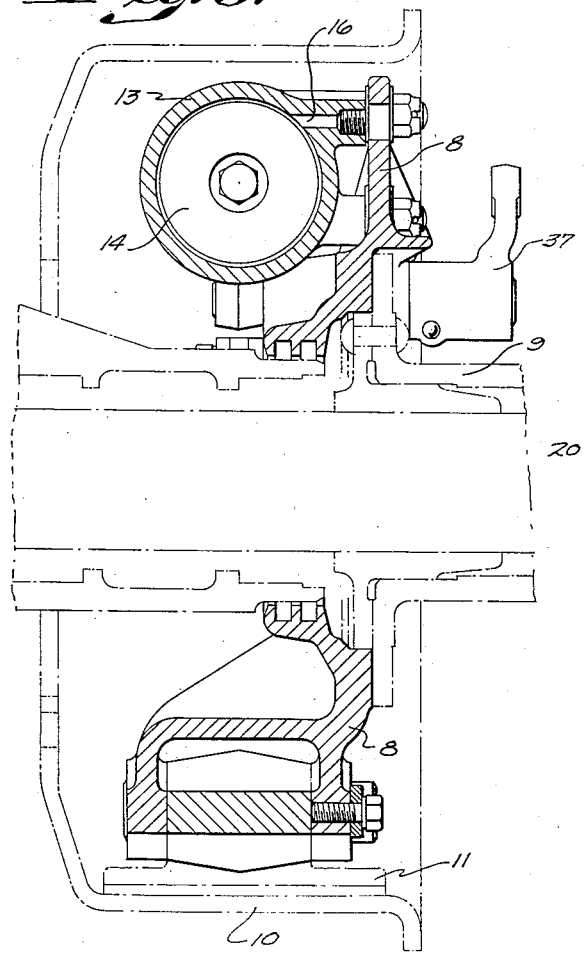
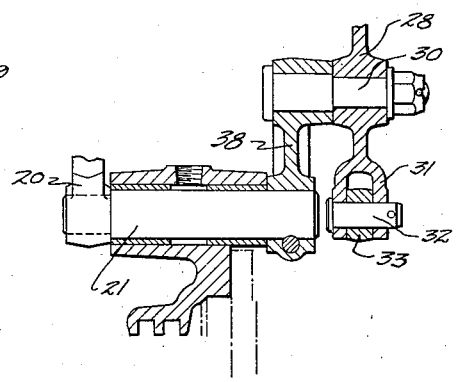
INVENTOR.
Niels A. Christensen
BY Quarles & French
ATTORNEYS Patented June 30, 1931

1,812,037

UNITED STATES PATENT OFFICE

NIELS A. CHRISTENSEN, OF CLEVELAND, OHIO

BRAKE MECHANISM

Application filed April 30, 1928, Serial No. 273,900. Renewed November 17, 1930.

The invention relates to brake mechanism and more particularly to brake mechanism for automotive vehicles.

The object of the present invention is to provide a combination fluid-pressure and manually-operated brake wherein the braking pressure from the fluid-pressure-operated motor is applied through a lever arrangement with the brake shoes and wherein the manual operation of the brake shoes either is used to augment the fluid pressure or in case of emergency is so associated with the brake mechanism as to act upon the levers without interfering with the operation of the fluid-pressure-operated motor.

The invention further consists in the several features hereinafter set forth and more particularly defined by claims at the conclusion hereof.

In the drawings Fig. 1 is a side elevation view of brake mechanism embodying the invention, parts being broken away and parts being shown in section;

Fig. 2 is a detail view similar to Fig. 1, viewed from the opposite side;

Fig. 4 is a detail sectional view taken on the line 4—4 of Fig. 2, parts being shown in dotted lines;

Fig. 5 is a detail sectional view taken on the line 5—5 of Fig. 1.

Figure 1:
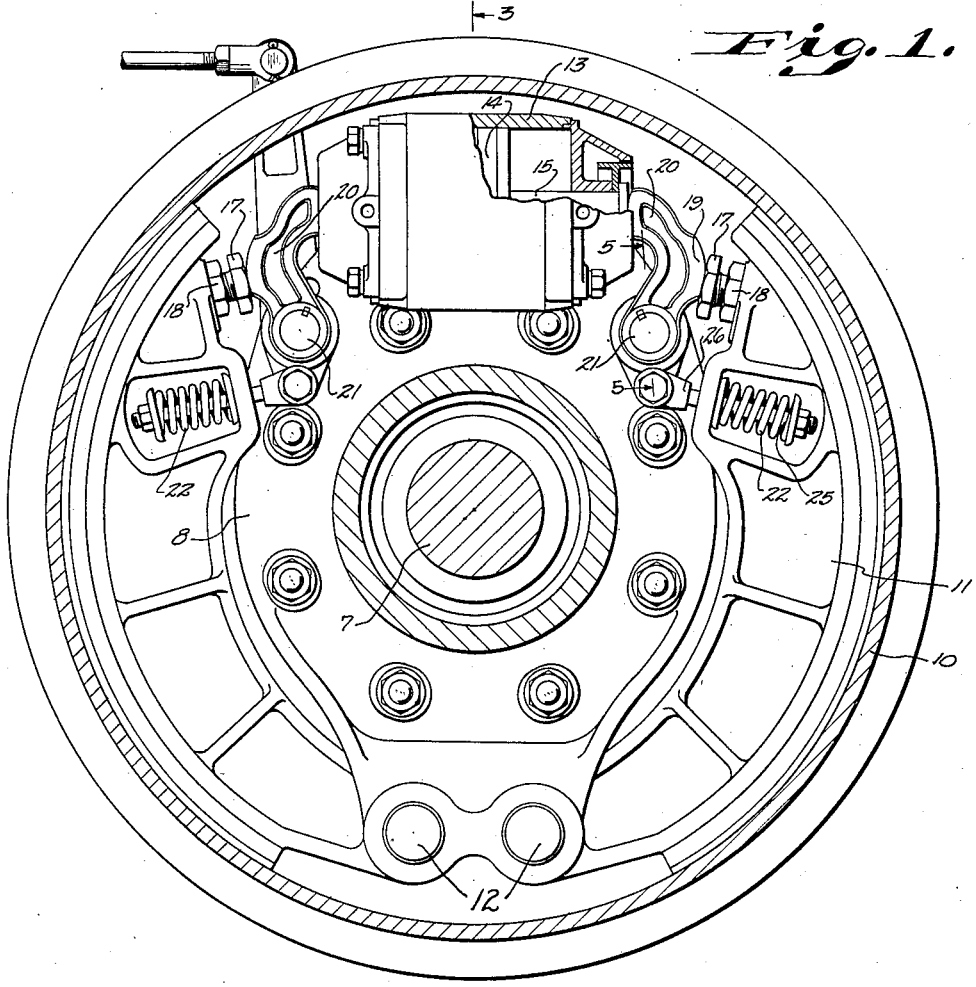
Figure 3:
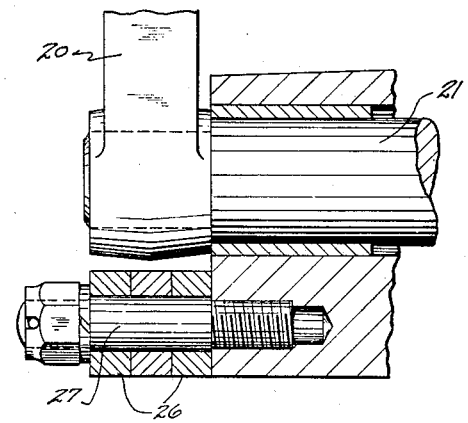
Fig. 3 is a detail sectional view taken on the line 3—3 of Fig. 1.

Referring to the drawings, the numeral 7 designates the wheel axle, 8 a brake support associated with the axle housing 9, 10 the brake drum and 11 a pair of brake shoes, each pivotally mounted upon an anchor pin bolt 12 upon said brake support, and 13 the cylinder of a fluid-pressure-operated motor having oppositely moving pistons 14 working therein, each provided with a piston or thrust-rod 15, compressed air or other pressure fluid being introduced into said cylinder between the pistons through a port 16.

The free end of each brake shoe is provided with an adjustable jackscrew 17 held in adjusted position by a lock-nut 18 and engaged by the intermediate portion 19 of a multiplying lever 20 whose free end is engaged by the rod 15 and whose other end is fixed upon a shaft 21 journalled in the brake support.

The brakes are moved to a release position in each instance by a spring 22 interposed between a part 23 of each shoe and a nut-retained washer 24 on a rod 25 passing through said part 23 and having a forked end 26 mounted on a bolt 27 secured to the brake support, said springs acting to move the shoes 11, levers 20 and piston 14 to a release position, it being noted that when fluid pressure is introduced into the brake cylinder through the operation of suitable control mechanism the pistons 14 are moved outwardly, causing the levers 20 to swing outwardly and thus swinging the shoes outwardly into braking engagement with the drum 10.

Where increased braking pressure is necessary or when the fluid pressure is not available, I have provided manually operable means acting on said shoes to move them into braking engagement with the drum. This means includes a manually-operated lever 28 secured at one end to part of the operating linkage 29, pivoted intermediate its ends upon a shaft 30 and having its forked lower end 31 connected by a pin 32 with a rod 33 which telescopes within a tube 34 secured to a rod 35 pivoted on a pin 36 carried by an arm or lever 37 fixed to the shaft 21 for one of the levers. The shaft 30 is mounted on an arm 38 fixed to the shaft 21 for the other multiplying lever 20.

With this construction, when the link 29 is pulled in the direction of the arrow the lever 28 swinging about the center provided by the shaft 30 causes the rod 33 to engage the rod 35 and swing the lever 37 outwardly, thus moving the lever 20 outwardly to apply the brake shoe associated therewith and at the same time the lever 38 swings outwardly under the action of the lever 28, thereby swinging the lever 20 associated with it outwardly to cause the other brake shoe to move into engagement with the drum, it being noted that the lever 28 is a floating lever having an imaginary fulcrum point between its pivot and the pin 32. When the fluid pressure motor acts independently the telescoping connection between the parts 35, 34 and 33 of the linkage connection between the lever 28 and the arm 37 permits the levers 20 being operated without interference from the lever 28 since the arm or lever 37 is then free to move with its shaft 21 and the other shaft 20 is free to move with the arm 38.

While I have shown the actuating mechanism applied to a shoe type brake, it will be understood that it may be applied to the free ends of a band type brake, such as is shown in my United States Letters Patent No. 1,620,073, of March 8, 1927, and, therefore, by the term "brake members" I mean to include either a pair of brake shoes or a brake band.

I desire it to be understood that this invention is not to be limited to any particular form or arrangement of parts except insofar as such limitations are included in the claims.

What I claim as my invention is:

1. In a wheel brake mechanism, the combination with the brake drum and brake members engageable therewith, of a pivoted lever associated with each brake member, an actuator associated with said levers for moving them to a brake application position, and means associated with the pivot shafts of said levers for moving them to a brake application position, said means including a lost motion connection permitting independent movement of said levers by said first-named actuator.

2. In a wheel brake mechanism, brake actuating mechanism comprising a pair of oppositely moving thrust members, pivoted, brake actuating levers, each having its free end associated with one of said thrust members, pivot shafts for said levers, an arm carried on the shaft of one of said levers, an operating lever pivotally mounted on said arm, and an actuating connection between said operating lever and the pivot shaft of the other lever including a link having lost motion in one direction.

3. In a wheel brake mechanism, brake actuating mechanism comprising a pair of oppositely moving thrust members, pivoted, brake actuating levers, each having its free end associated with one of said thrust members, pivot shafts for said levers, an arm secured to one of said shafts, an operating lever mounted on said arm, an arm secured to the other of said shafts, and a telescopic operating linkage between said last-named arm and said lever.

In testimony whereof, I affix my signature.

NIELS A. CHRISTENSEN.